(12) United States Patent
Heim (10) Patent No.: US 8,359,380 B2
(45) Date of Patent: Jan. 22, 2013

(54) CONFIGURING A HOST USING CONFIGURATION PARAMETERS OF ANOTHER HOST

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 423 days.

(21) Appl. No.: 12/551,173

(22) Filed: Aug. 31, 2009

(65) Prior Publication Data

US 2011/0055364 A1 Mar. 3, 2011

(51) Int. Cl.
*G06F 15/173* (2006.01)
*G06F 15/177* (2006.01)
(52) U.S. Cl. .................. 709/223; 709/220; 709/250
(58) Field of Classification Search .......... 709/220–222, 709/223–224, 250
See application file for complete search history.

(56) References Cited

U.S. PATENT DOCUMENTS

| | | | |
|---|---|---|---|
| 6,286,038 B1 * | 9/2001 | Reichmeyer et al. | 709/220 |
| 7,107,326 B1 * | 9/2006 | Fijolek et al. | 709/220 |
| 7,290,046 B1 * | 10/2007 | Kumar | 709/223 |
| 7,643,420 B2 * | 1/2010 | Kwan et al. | 370/235 |
| 8,005,013 B2 * | 8/2011 | Teisberg et al. | 370/254 |
| 2009/0241116 A1 * | 9/2009 | Mullin | 718/100 |
| 2009/0327462 A1 * | 12/2009 | Adams et al. | 709/223 |
| 2010/0100611 A1 * | 4/2010 | Hatasaki et al. | 709/221 |
| 2012/0042069 A1 * | 2/2012 | Hatasaki et al. | 709/224 |

OTHER PUBLICATIONS

"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.

* cited by examiner

*Primary Examiner* — Bharat N Barot
(74) *Attorney, Agent, or Firm* — Lowenstein Sandler PC (57) ABSTRACT

Techniques for automatic network discovery for host configurations are described herein. A management server may receive a first message from a first host entering a network, where the first message includes a network identifier (ID) identifying a logical network coupled to a network interface card (NIC) of the first host. In response to the first message, the management server may automatically configure the NIC of the first host using one or more network configuration parameters of a second host based on the first message, where the second host has been coupled to the logical network prior to the first host.

21 Claims, 5 Drawing Sheets

CONFIGURING A HOST USING CONFIGURATION PARAMETERS OF ANOTHER HOST

TECHNICAL FIELD

Embodiments of the present invention relates generally to network computing. More particularly, embodiments relate to techniques for automatic network discovery for host configurations.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of, and may or may not be aware of, the virtualization environment.

The virtualization technologies have wide applications in the computer field with the development of computer systems. For example, such virtualization technologies can be used to implement a virtual desktop application which runs within a virtual machine and can be accessed from a client over a network, such as, for example, SolidICE™ available from Red Hat, Inc. of Raleigh, N.C.

Typically, when a host that hosts one or more VMs is configured, for example, by an administrator, a network interface such as a network interface card (NIC) is manually configured. For a large amount of hosts to be configured and each host may have multiple NICs, this manual process can be cumbersome and error prone.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for automatic network discovery for a host are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

As described above, in order to configure a network interface of a host, an administrator typically has to manually set up certain parameters for each network interface of the host matching a physical connection of the host to the network. For a large amount of hosts to be configured, this manual process can be cumbersome and error prone, especially when a host can be coupled to multiple networks via separate physical network interface cards (NICS), where each NIC may be coupled to a different physical or logical network.

According to some embodiments, when configuring a network interface of a host, certain parameters (e.g., cluster and/or logical network identifiers or IDs, etc.) of the network interface may be automatically obtained from another host that is located within the same network or same network segment (also referred to as a logical network). According to one embodiment, a management server automatically identifies certain network parameters using an existing host and uses the identified network parameters to configure a network interface of a new host. For example, after manually configuring the first host in a particular network segment, subsequent hosts entering the same network segment can be automatically configured by automatically detecting or learning certain network parameters from the first host (e.g., existing host in the same network segment).

Alternatively, an existing host in the same network segment may periodically broadcast certain information (e.g., logical network ID) of the network segment to the rest of members coupled to the same network segment. When a new host is coupled to the network segment, the new host can listen and obtain such information. The new host may then report the obtained information to a management server. Based on the network information obtained from the new host, the management server can configure the new host using certain network parameters of an existing host that is coupled to the same network segment. As a result, at least some of the network configuration parameters of the new host can be automatically obtained without having the administrator to manually configure the new host.

Figure 1:
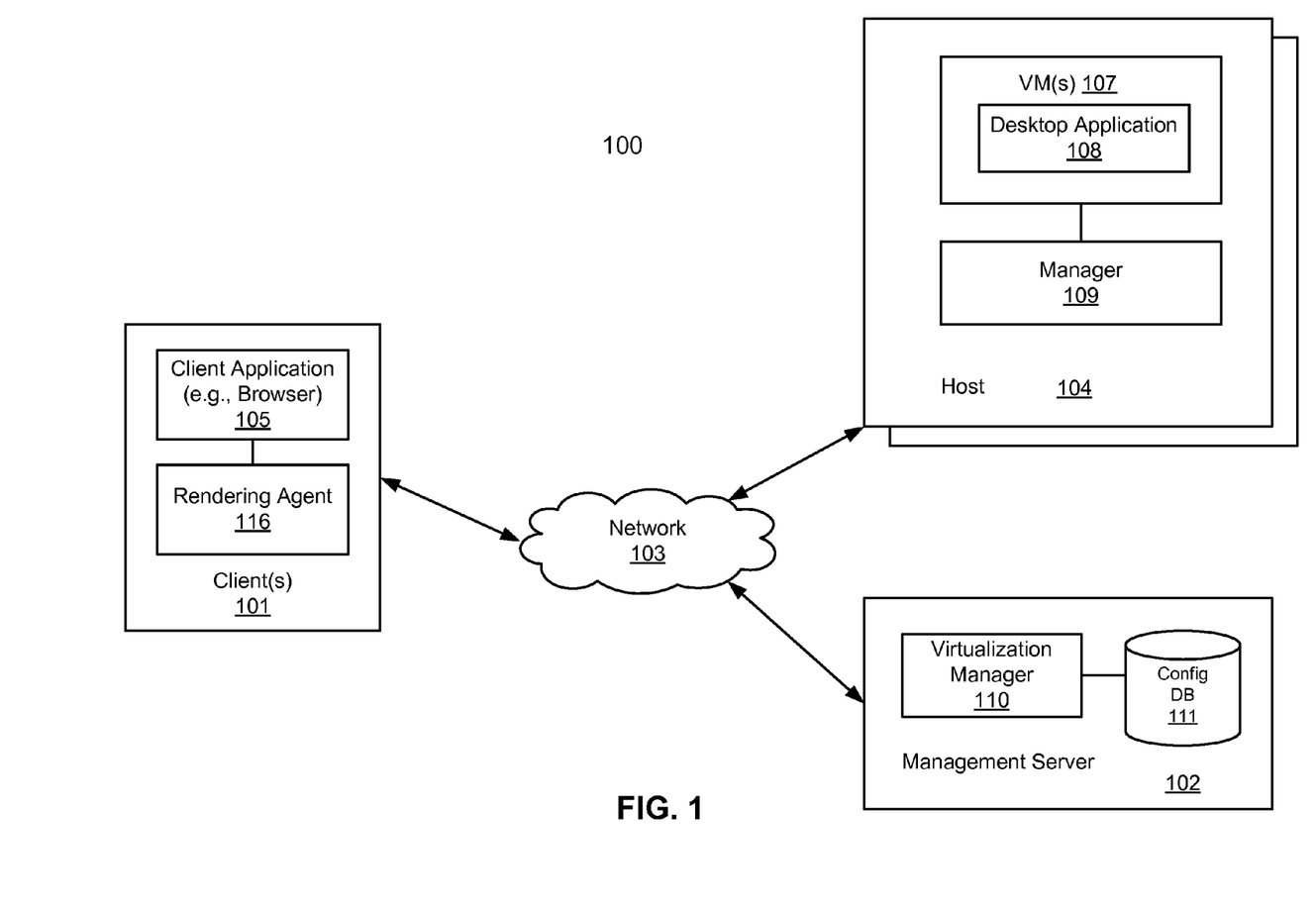
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of servers 104 over a network 103. Server 104 may represent an independent machine. Network 103 may be a local area network (LAN) or a wide area network (WAN) and may be a combination of one or more networks. Client 101 can be any computer system in communication with server 104 for remote execution of applications at server 104.

For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application 108) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one embodiment, server 104 is configured to host one or more virtual machines 107, each having one or more desktop applications 108 (e.g., desktop operating system). Desktop application 108 may be executed and hosted by an operating system within virtual machine 107. Such an operating system in virtual machine 107 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Virtual machine 107 can be any type of virtual machines, such as, for example, hardware emulation, full virtualization, para-virtualization, and operating system-level virtualization virtual machines. Different virtual machines hosted by server 104 may have the same or different privilege levels for accessing different resources.

System 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership).

Host server 104 and client 101 may be managed by a management server 102, which may be a separate machine or part of the machine hosting server (e.g., virtual desktop server or VDS). For example, in a graphics remoting application, host server 104 may be implemented as a VDS server while management server 102 may be implemented as a VDC (virtual desktop control) server.

In one embodiment, server 104 may be a member of a cluster of servers, where each of the member servers of the same cluster is coupled to the same network or the same segment of a network, also referred to as a logical network. In one embodiments, server 104 may include multiple network interfaces (not shown), which may be coupled to the same or different logical network. Each network interface of server 104 may be configured via management server 102, for example, by an administrator. Server 104 may be configured to be coupled to multiple networks (physical or logical network), such as, for example, a storage network, a virtual local area network (VLAN) for the guests, a management network, and/or a remote display network for remote accesses, etc.

According to one embodiment, given a logical network, the network discovery of the first host coupled to the logical network may be manually configured by an administrator. The network configuration information or parameters may be stored in configuration database 111. However, any host that is subsequently coupled to the same logical network may be at least in part automatically configured by manager 110 using certain network parameters that are automatically obtained (e.g., learned via manager 109) from an existing host in the network and/or stored in configuration database 111. As a result, an administrator does not have to repeat the same manual network configuration process for the additional hosts to be coupled to the network.

Figure 2:
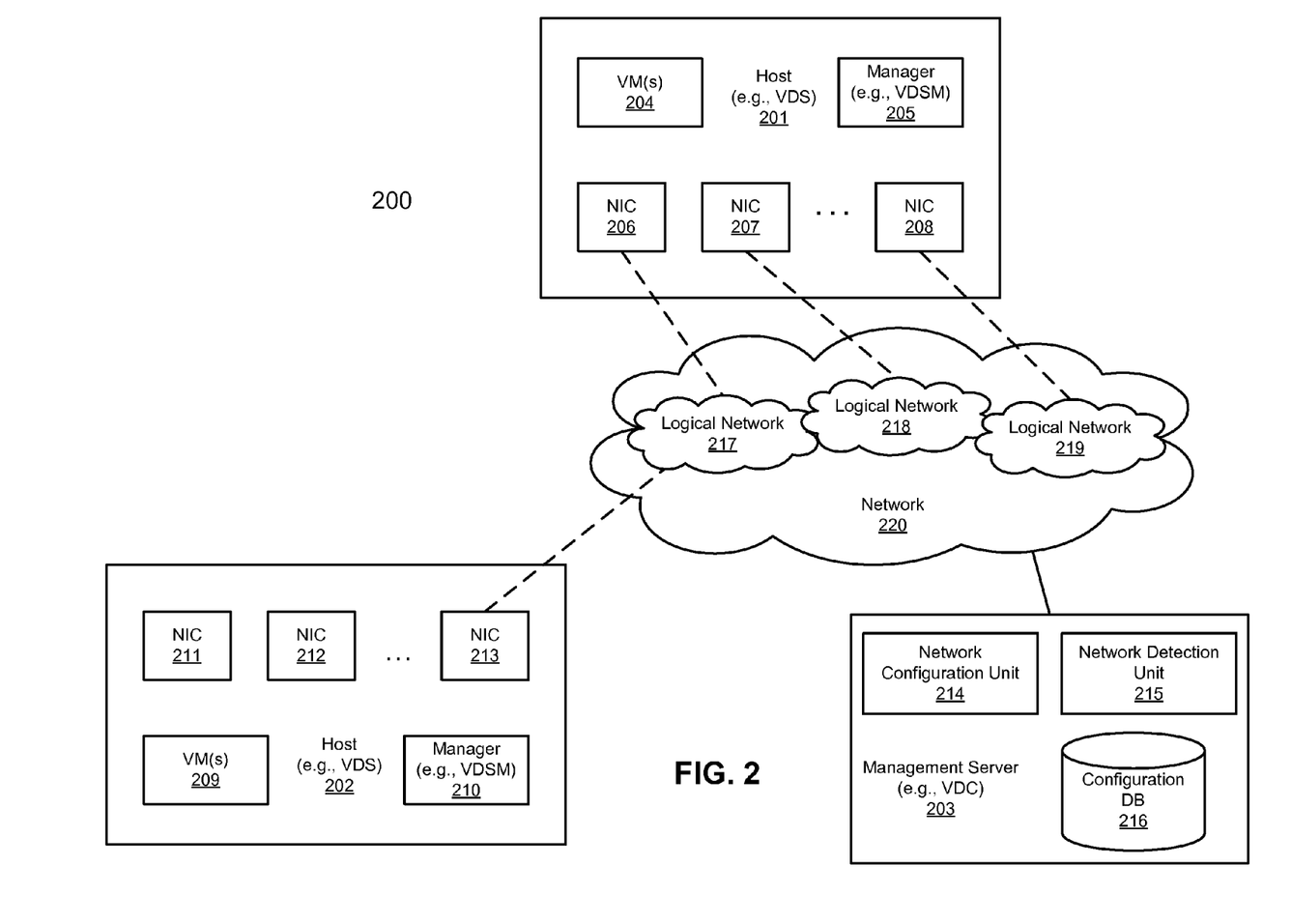
FIG. 2 is a block diagram illustrating an example of a network configuration according to another embodiment.

FIG. 2 is a block diagram illustrating an example of a network configuration according to an alternative embodiment of the invention. For example, hosts 201-202 may be implemented as part of a cluster associated with host 104 (e.g., VDS) and server 203 may be implemented as part of server 102 (e.g., VDC) of FIG. 1. Referring to FIG. 2, hosts 201-202 and management server 203 are communicatively coupled to each other over network 220. Each of the hosts 201-202 may include one or more network interfaces (also referred to as network interface cards or NICs) and host one or more VMs. In this example, host 201 includes NICs 206-208 and hosts one or more VMs 204. Each NIC may be associated with a specific VM hosted by host 201. Similarly, host 202 includes NICs 211-213 and hosts one or more VMs 209. Each of the NICs is coupled to one or more logical networks and detected and configured by network detection unit 215 and network configuration unit 214 of management server 203.

In this example, NIC 206 is coupled to logical network 217; NIC 207 is coupled to logical network 218; and NIC 208 is coupled to logical network 219. Each of the logical networks 217-219 is associated with a network identifier (e.g., network name) that uniquely identifies the respective network. Note that multiple NICs may be coupled to the same or different logical networks dependent upon a specific network configuration. Similarly, a single NIC may be coupled to multiple logical networks. According to one embodiment, after a first host in a network has been detected and configured by an administrator via server 203, a subsequent host entering the same network can be at least partially automatically configured by server 203 using similar network configuration information obtained from an existing host, which may be stored in configuration database 216.

For the purposes of illustration, it is assumed that host 201 is an existing host configured by server 203 where NICs 206-208 are communicatively coupled to logical networks 217-219 respectively. In one embodiment, manager 205 (e.g., VDS manager or VDSM) is configured to broadcast a message (also referred to as a discovery message) in each of the networks 217-219 via a respective one of NICs 206-208. For example, manager 205 may broadcast a discovery message in network 217 via NIC 206, where the discovery message includes at least a network identifier (ID) identifying network 217 and/or a network cluster ID that identifies a cluster of which host 201 is a member. Note that a network cluster ID may be needed if the network ID is not unique. The network ID may or may not be unique dependent upon specific implementations. A logical network ID is the important part, which allows the management server 203 to configure the hosts 201-202 with the configuration relevant to that logical network. The management server 203 can also use configuration from the second host sending the broadcast, but it does not have to if the management server 203 has the information needed to configure the network (e.g., stored in database 216), the management server 203 just needs to know which network it is.

For the purpose of illustration, it is assumed that host 202 is also a member of the same cluster associated with host 201. Generally, network interfaces of hosts in the same cluster are coupled to the same network or same network segment (e.g., logical network). According to one embodiment, when host 202 enters network 220, assuming that NIC 213 of host 202 is coupled to logical network 217, manager 210 (e.g., VDSM) of host 202 would listen and receive the discovery message via NIC 213, where the discovery message is broadcast by manager 205 of host 201 via NIC 206. In response to the discovery message, manager 210 reports via NIC 213 to management server 203 and detected by network detection unit 215, including identifying the network identifier associated with network 217 and/or the cluster ID associated with host 202. In response to the report received from host 202, network configuration unit 214 of management server 203 automatically configures NIC 213 of host 202, using at least some network configuration parameters similar to those associated with NIC 206 of host 201, which may be stored in database 216. Similarly, network detection unit 215 and network configuration unit 214 detect and configure NICs 211-212 automatically using at least some network configuration parameters obtained from the corresponding existing NICs of an existing host, such as NICs 207-208 of host 201. As a result, the amount of the manual network configuration process can be significantly reduced.

According to one embodiment, in order to reduce network traffic, only one existing host (e.g., the first host entering the network) of a network or cluster selected by management server 203 is configured to broadcast a discovery message for each NIC associated with the selected host. Alternatively, each of the existing hosts may be configured to broadcast a discovery message for each NIC associated with each existing host in a network or cluster. Similarly, a new host entering the network or cluster may listen and intercept multiple discovery messages and report all of them to management server 203 to enable management server 203 to automatically configure at least a portion of network interfaces of the new host.

According to another embodiment, each new host entering a network is configured to report an IP address and subnet mask of each NIC to management server 203. In response, management server 203 is configured to determine whether there is an existing host in the same subnet based on the subnet mask. If there is an existing host located in the same subnet, the management server 203 may automatically configure the new host using similar network configuration information associated with the existing host as described above.

According to another aspect of the invention, when a new host is entering a network and there is no existing host in the network, a DHCP (dynamic host configuration protocol) unit or server (not shown) associated with the network is configured to detect certain network information, such as an IP address and subnet mask for each NIC associated with the new host. The new host then reports such information (e.g., IP address and subnet mask obtained via DHCP) to management 203 as a suggestion for configuring each NIC of the new host (e.g., creating a logical network for each NIC).

That is, the network detection unit 215 of management server 203 may constantly or periodically monitor and collect network information (e.g., any network information that it can detect). Such network information can subsequently be used to automatically configure a new host entering the network. For example, such network information may be collected by listening to broadcasts on the network to detect whether multiple network segments are using a physical network (i.e., multiple virtual local area networks or VLANs are configured on a particular port), sniffing packets based on the VLAN tags to detect whether a trunk has been defined, detecting whether a bond is defined in a switch, accessing certain network equipments to obtain certain network configuration information of the equipments, and detecting network interfaces for storage and/or network management purposes, etc. Note that some or all of the components as shown in FIG. 2 may be implemented in software, hardware, or a combination of both.

Figure 3:
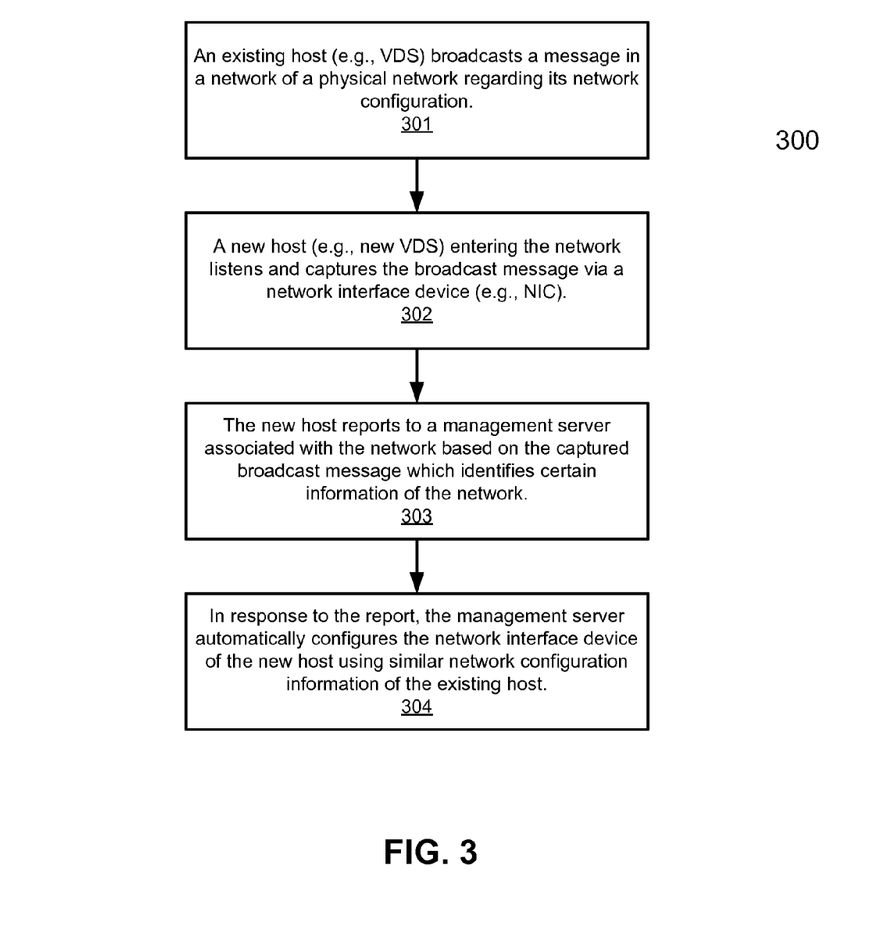
FIG. 3 is a flow diagram illustrating a method for automatically configuring a network interface of a host according to one embodiment.

FIG. 3 is a flow diagram illustrating a method for automatically configuring a network interface of a host according to one embodiment. Note that method 300 may be performed by processing logic which may include software, hardware, or a combination of both. For example, method 300 may be performed by network configuration unit 214 and/or network detection unit 215 of FIG. 2. Referring to FIG. 3, at block 301, an existing host of a network (e.g., network segment or logical network) broadcasts a discovery message in the network regarding its network configuration, for example, identifying a network ID of the network and/or a cluster ID associated with the existing host. When a new host enters the network, at block 302, the new host listens and captures the broadcast message via a NIC. At block 303, the new host reports (e.g., sending a message) via a corresponding NIC to a management server associated with the network based on the captured broadcast message, where the report identifies certain information about the network. In response to the report, at block 304, the management server automatically configures at least a portion of the NIC of the new host using similar network configuration information of the existing host.

Figure 4:
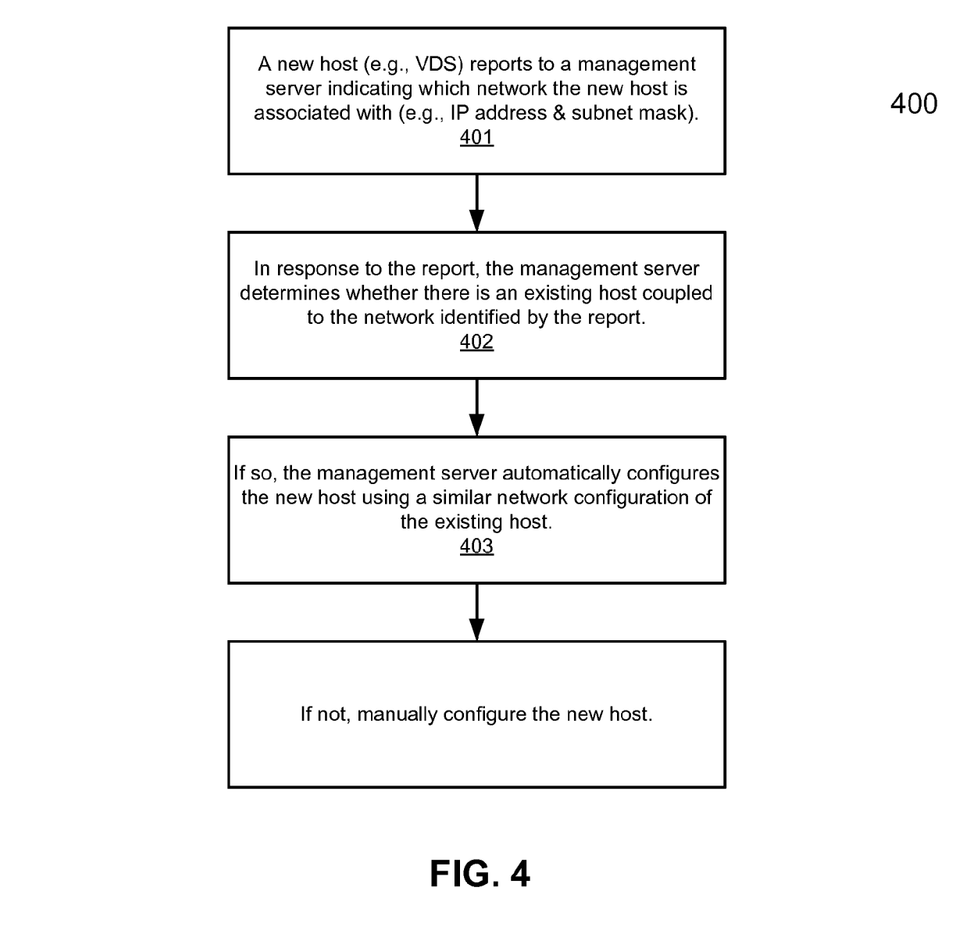
FIG. 4 is a flow diagram illustrating a method for automatically configuring a network interface of a host according to another embodiment.

FIG. 4 is a flow diagram illustrating a method for automatically configuring a network interface of a host according to another embodiment. Note that method 400 may be performed by processing logic which may include software, hardware, or a combination of both. For example, method 400 may be performed by network configuration unit 214 and/or network detection unit 215 of FIG. 2. Referring to FIG. 4, at block 401, a new host entering a network (e.g., network segment or logical network) reports to a management server indicating which network the new host is associated with (e.g., IP address and subnet). In response, at block 402, the management server determines whether there is an existing host in the network based on the report. If there is an existing host in the network, at block 403, the management server automatically configures the new host based on a network configuration similar to the existing host. Otherwise, at block 404, the new host has to be manually configured.

Figure 5:
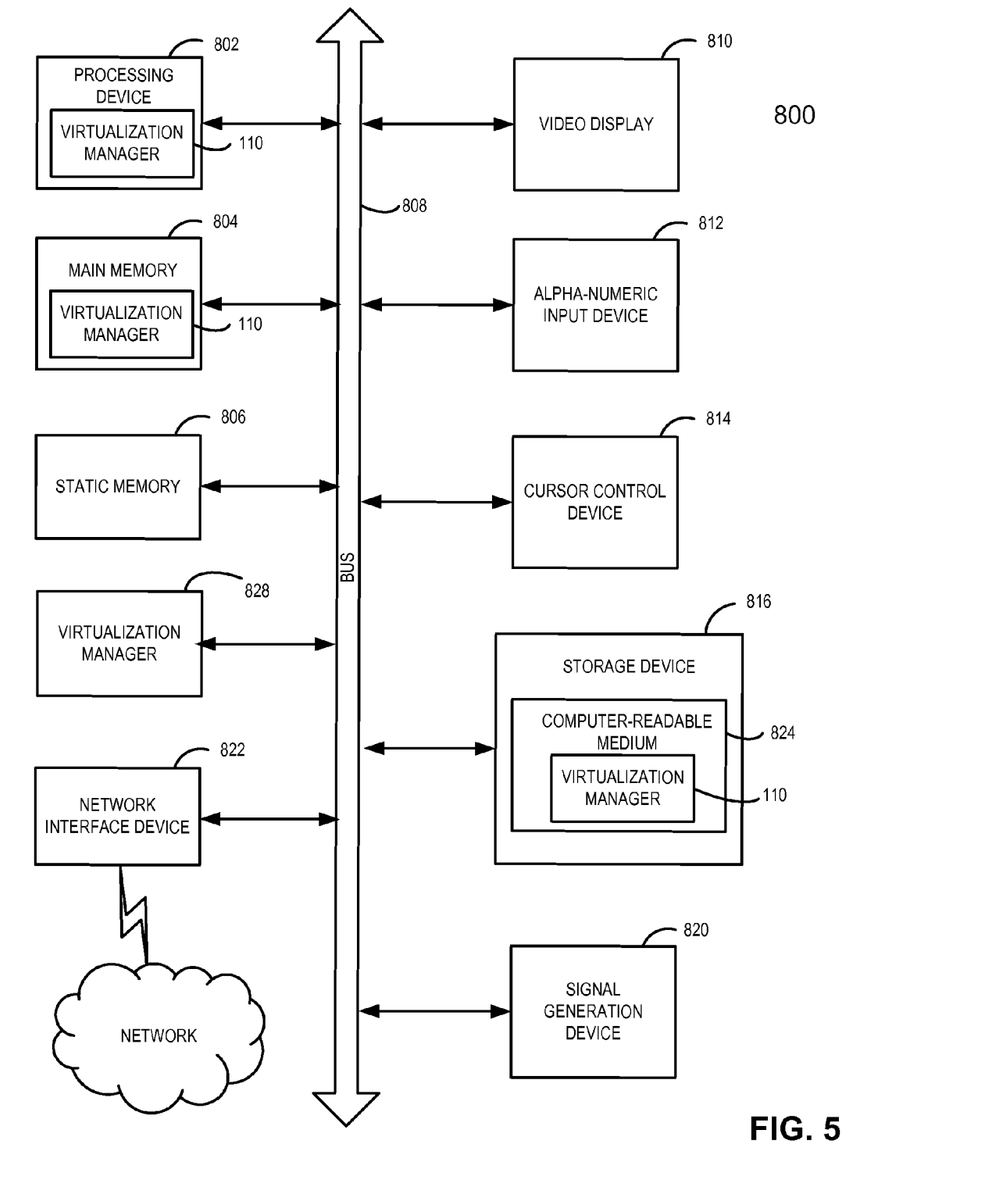
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 110 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., virtualization manager 110) embodying any one or more of the methodologies or functions described herein. The virtualization manager 110 may also reside, completely or at least partially, within the main memory 804 and/or within the processing device 802 during execution thereof by the computer system 800, the main memory 804 and the processing device 802 also constituting machine-accessible storage media. The virtualization manager 110 may further be transmitted or received over a network via the network interface device 822.

The computer-readable storage medium 824 may also be used to store the virtualization manager 110 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
receiving, by a management server, a first message from a first host entering a network, the first message including a network identifier (ID) identifying a logical network coupled to a network interface card (NIC) of the first host;
identifying, by the management server, a second host associated with the logical network coupled to the NIC of the first host using the network ID identifying the logical network, wherein the second host has been associated with the logical network prior to the first host;
identifying, by the management server, one or more network configuration parameters of a NIC of the second host, wherein the NIC of the second host has been coupled to the logical network prior to the NIC of the first host; and
configuring, by the management server, the NIC of the first host using the one or more network configuration parameters of the NIC of the second host.

2. The method of claim 1, further comprising:
prior to sending the first message by the first host, the second host periodically broadcasting a second message in the logical network, the second message including the network identifier that identifies the logical network; and
the first host listening and capturing the second message from the second host over the logical network, wherein the first message is sent by the first host based on the captured second message.

3. The method of claim 2, further comprising retrieving the one or more network configuration parameters associated with the second host from a database storing network configuration parameters for a plurality of hosts coupled to the network.

4. The method of claim 3, wherein the first message further includes a cluster ID identifying a network cluster of which the second host is a member.

5. The method of claim 1, wherein the first message includes an IP address and a subnet mask associated with the first host, and wherein the second host is coupled to an identical subnet and identified based on the IP address and the subnet mask.

6. The method of claim 2, wherein the second host comprises a plurality of NICs, each being coupled to one or more logical networks, and wherein for each of the NICs, the second host is configured to broadcast a message via a respective NIC in a logical network associated with each NIC.

7. The method of claim 2, wherein the first host comprises a plurality of NICs, each being coupled to a specific logical network, and wherein for each of the NICs, the first host is configured to listen and capture a message broadcast from an existing host coupled to the same logical network to obtain at least a network identifier of the same logical network.

8. A non-transitory computer-readable storage medium including instructions that, when executed by a processing system, cause the processing system to perform a method, the method comprising:
receiving, by a management server, a first message from a first host entering a network, the first message including a network identifier (ID) identifying a logical network coupled to a network interface card (NIC) of the first host;
identifying, by the management server, a second host associated with the logical network coupled to the NIC of the first host using the network ID identifying the logical network, wherein the second host has been associated with the logical network prior to the first host;
identifying, by the management server, one or more network configuration parameters of a NIC of the second host, wherein the NIC of the second host has been coupled to the logical network prior to the NIC of the first host; and
configuring, by the management server, the NIC of the first host using the one or more network configuration parameters of the NIC of the second host.

9. The non-transitory computer-readable storage medium of claim 8, wherein the method further comprises:
prior to sending the first message by the first host, the second host periodically broadcasting a second message in the logical network, the second message including the network identifier that identifies the logical network; and
the first host listening and capturing the second message from the second host over the logical network, wherein the first message is sent by the first host based on the captured second message.

10. The non-transitory computer-readable storage medium of claim 9, wherein the method further comprises retrieving the one or more network configuration parameters associated with the second host from a database storing network configuration parameters for a plurality of hosts coupled to the network.

11. The non-transitory computer-readable storage medium of claim 10, wherein the first message further includes a cluster ID identifying a network cluster of which the second host is a member.

12. The non-transitory computer-readable storage medium of claim 8, wherein the first message includes an IP address and a subnet mask associated with the first host, and wherein the second host is coupled to an identical subnet and identified based on the IP address and the subnet mask.

13. The non-transitory computer-readable storage medium of claim 9, wherein the second host comprises a plurality of NICs, each being coupled to a specific logical network, and wherein for each of the NICs, the second host is configured to broadcast a message via a respective NIC in a logical network associated with each NIC.

14. The non-transitory computer-readable storage medium of claim 9, wherein the first host comprises a plurality of NICs, each being coupled to a specific logical network, and wherein for each of the NICs, the first host is configured to listen and capture a message broadcast from an existing host coupled to the same logical network to obtain at least a network identifier of the same logical network.

15. A system, comprising:
a network detection unit to receive a first message from a first host entering a network, the first message including a network identifier (ID) identifying a logical network coupled to a network interface card (NIC) of the first host; and
a network configuration unit to identify a second host associated with the logical network coupled to the NIC of the first host using the network ID identifying the logical network, wherein the second host has been associated with the logical network prior to the first host, to identify one or more network configuration parameters of a NIC of a second host, wherein the NIC of the second host has been coupled to the logical network prior to the NIC of the first host, and to automatically configure the NIC of the first host using the one or more network configuration parameters of the NIC of the second host.

16. The system of claim 15, wherein prior to sending the first message by the first host, the second host is configured to periodically broadcast a second message in the logical network, the second message including the network identifier that identifies the logical network, wherein the first host is configured to listen and capture the second message from the second host over the logical network, and wherein the first message is sent by the first host based on the captured second message.

17. The system of claim 16, wherein the network configuration unit is configured to retrieve the one or more network configuration parameters associated with the second host from a database storing network configuration parameters for a plurality of hosts coupled to the network.

18. The system of claim 17, wherein the first message further includes a cluster ID identifying a network cluster of which the second host is a member.

19. The system of claim 15, wherein the first message includes an IP address and a subnet mask associated with the first host, and wherein the second host is coupled to an identical subnet and identified based on the IP address and the subnet mask.

20. The system of claim 16, wherein the second host comprises a plurality of NICs, each being coupled to a specific logical network, and wherein for each of the NICs, the second host is configured to broadcast a message via a respective NIC in a logical network associated with each NIC.

21. The system of claim 16, wherein the first host comprises a plurality of NICs, each being coupled to a specific logical network, and wherein for each of the NICs, the first host is configured to listen and capture a message broadcast from an existing host coupled to the same logical network to obtain at least a network identifier of the same logical network.

* * * * *